United States Patent
Balzan et al.

(10) Patent No.: US 9,448,419 B2
(45) Date of Patent: Sep. 20, 2016

(54) PROCESS OF MANUFACTURING OF COATED SPECTACLE FRAMES, AND COATED SPECTACLE FRAMES SO OBTAINED

(71) Applicant: HAPTER SRL, Belluno (IT)

(72) Inventors: Eric Balzan, Belluno (IT); Mirko Forti, Belluno (IT)

(73) Assignee: HAPTER SRL, Belluno (IT)

( * ) Notice: Subject to any disclaimer, the term of this patent is extended or adjusted under 35 U.S.C. 154(b) by 0 days.

(21) Appl. No.: 14/406,270

(22) PCT Filed: Jun. 7, 2013

(86) PCT No.: PCT/IB2013/001196
§ 371 (c)(1),
(2) Date: Dec. 8, 2014

(87) PCT Pub. No.: WO2013/182894
PCT Pub. Date: Dec. 12, 2013

(65) Prior Publication Data
US 2015/0131046 A1    May 14, 2015

(30) Foreign Application Priority Data
Jun. 8, 2012 (IT) ............... BL2012A0004

(51) Int. Cl.
*G02C 5/00* (2006.01)
*B29D 12/02* (2006.01)

(52) U.S. Cl.
CPC ............ *G02C 5/008* (2013.01); *B29D 12/02* (2013.01); *G02C 5/006* (2013.01); *G02C 2200/12* (2013.01); *G02C 2200/14* (2013.01); *G02C 2200/16* (2013.01); *Y10T 29/31* (2015.01)

(58) Field of Classification Search
CPC ...... B29D 12/02; G02C 11/02; G02C 5/008; G02C 5/006; G02C 2200/12; G02C 2200/14; G02C 7/027; G02C 13/001; G02C 13/003; G02C 5/00; Y10T 29/31
USPC ........... 351/41, 178, 51, 158, 159.75; 29/20; 700/157
See application file for complete search history.

(56) References Cited

U.S. PATENT DOCUMENTS 4,592,629 A * 6/1986 Giacomelli ........... B29C 43/021
351/137
5,786,881 A * 7/1998 Monroe ................. B29D 12/02
351/41

(Continued)

FOREIGN PATENT DOCUMENTS

AT          505415 A1    1/2009
EP          1903373 A1   3/2008

(Continued)

*Primary Examiner* — Ricky Mack
*Assistant Examiner* — Daniele Manikeu
(74) *Attorney, Agent, or Firm* — Mark M. Friedman

(57) ABSTRACT

The process of manufacturing of a coated spectacle frames is characterized by the following three main manufacturing processes:
A—Bonding of at least one outer layer of coating material (A, C) on at least an inner layer of material having a structural function (B). The result is a coated panel (D);
B—Cutting of the spectacle frame (E) from that covered panel (D);
C—Bending and shaping of the previously cut spectacle (F).
The layers that form the particular coated panel (D) may origin from different combinations of different materials, as indicated in the description and claims.

7 Claims, 1 Drawing Sheet

(56) References Cited

U.S. PATENT DOCUMENTS

| | | | |
|---|---|---|---|
| 6,435,680 B2* | 8/2002 | Mocciaro | G02C 5/008 |
| | | | 351/131 |
| 2011/0170051 A1 | 7/2011 | Jacquemin | |
| 2011/0205483 A1* | 8/2011 | Margolis | G02C 1/06 |
| | | | 351/86 |
| 2013/0069274 A1* | 3/2013 | Zhang | B29C 45/1671 |
| | | | 264/279 |

FOREIGN PATENT DOCUMENTS

| | | |
|---|---|---|
| FR | 2575106 A1 | 6/1986 |
| WO | 2007/017743 A1 | 2/2007 |
| WO | 2009/118009 A1 | 10/2009 |

\* cited by examiner

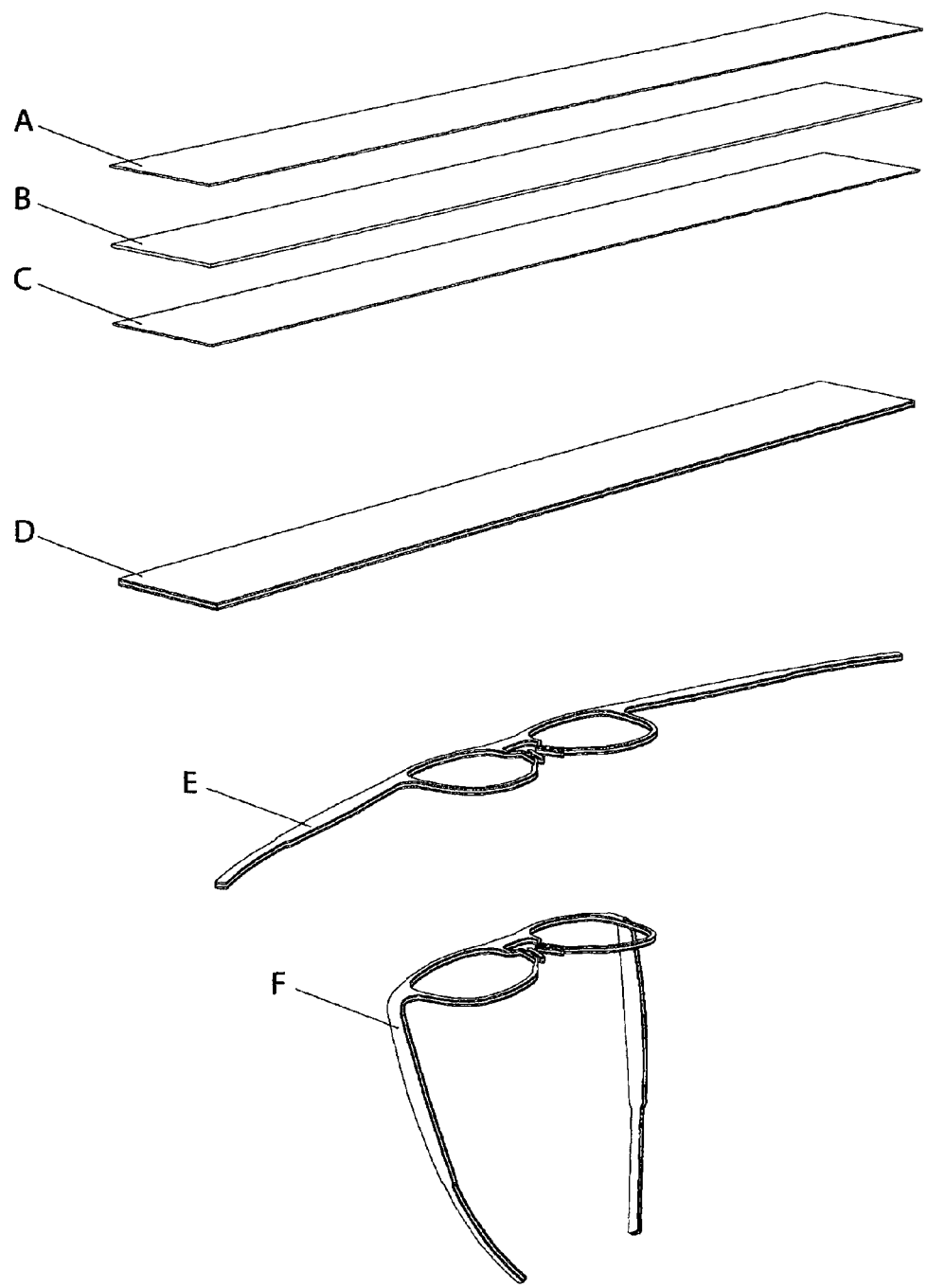

PROCESS OF MANUFACTURING OF COATED SPECTACLE FRAMES, AND COATED SPECTACLE FRAMES SO OBTAINED

The present patent application relates to a manufacturing process of coated spectacle frames—or parts of these —, and to the coated spectacle frames—or parts of these —, so obtained.

In the state of the art, some types of spectacle frames are externally coated with a textile material or leather. These coatings are usually applied after the production of the spectacles structure, as an embellishment, covering their surfaces entirely or partially. Normally they are plastic glasses, that after being produced are coated with textile material or leather. There are examples of temple-arms of eyeglasses made of metal material coated with textile material or leather, having the edges of the material sewn together by hand. In the latter case they are normally made of tubular-shaped textile previously sewn, which are put on the metal core, but in any case after the production of the temple arms.

With regards to the state of the art,

FR 2575106 discloses a spectacle frame realized by sticking together several layers of different materials, previously cut, specifically leather and plastic materials.

This process has the disadvantage of having multiple manufacturing steps, that are different cutting processes of the different materials, only after which the bonding process is performed. In particular this process implies the cutting of the individual layers of material before bonding, with the consequent problems of precision when positioning the layers one on the top of the other.

The process described in this application considers a single operation of bonding the covering sheets on the structural material in order to perform the cutting of the different parts of glasses or spectacle frames directly on the sheet of bonded material previously assembled, instead of bonding the previously-cut covering sheets described by FR2575106. Furthermore, this application's process uses textile material, and not leather as in the aforementioned patent.

DESCRIPTION OF THE DRAWINGS

In the attached drawing, Page 1/1—FIG. 1, "A" and "C" represent the external layers of coating material that are coupled to the inner layer "B", which acts as structural material.

Once the layers of different materials are coupled, 'the panel coated "D" is obtained, thus composed by several layers of material coupled together.

Once the coated material "D" is cut according to the contour of the spectacles, the cut piece "E" will be obtained. The cut piece "E" will then be shaped and bent to obtain the look of spectacles "F".

Therefore "F" represent the finished spectacles, once bent and shaped.

The eyewear "F" is therefore coated with layers of coating materials "A" and "C" previously bonded to the material "B", prior to the operations of cutting and shaping.

DESCRIPTION OF THE INVENTION

The manufacturing process of coated spectacles is characterized by the following three main processing steps:

A—Bonding of at least one outer layer of coating material (A, C) on at least an inner layer of material having a structural function (B). The result is a coated panel (D);

B—Cutting the spectacle frame (E) from that bonded panel (D);

C—Bending and shaping the previously cut eyewear (F).

The layers that will form the particular coated panel (D) may be formed by the following combinations of different materials:

The internal structural layer/s is made of metal, while the outer covering layer/s is made of textile material, or leather, or wood, or plastic, or rubber, or combinations thereof;

The internal structural layer/s is made of composite material, while the outer covering layer/s is made of textile material, or wood, or leather, or rubber, or plastic material, or combinations thereof.

The internal structural layer/s is made of plastic material, while the outer covering layer/s is made of textile material, or rubber, plastic material or different, or wood, or combinations thereof;

The internal structural layer/s is made of wood, while the outer covering layer/s is made of textile material, or rubber, or plastic, or wood, or combinations thereof.

To solve cutting problems, in particular of some structural materials more difficult to cut with the current manufacturing techniques, it may be necessary in some cases to pre-cut the internal structural layer, prior to bonding it with the coating materials, and then proceed with the operation of cutting of the covered panels (D).

This production process aims to the reduction and simplification of the manufacturing steps necessary to make a coated spectacle frame, and to the enhancement of its quality and reliability.

To be able to reduce the number of manufacturing steps and be able to bond such different materials, such as steel and fabric together, extensive research on materials and processing techniques was necessary.

The method of manufacturing gives the product—the spectacle frame—the following characteristics and the relative specific identity:

The combination of different materials with different functions (structural and coating) in a single sheet that will form, when cut and shaped, the product;

The inner structural layer will confer the necessary stiffness, thanks to its mechanical/structural properties, while the outer coating layers will give the required softness, comfort, or aesthetic function;

The particular sharp cutting along the contour of the spectacle, free from seams or other protection elements of the edge, because the different layers will be cut according to the same cutting contour in one single operation;

The visibility of the single layers along the edge of the spectacle, which will highlight the structural layer/s and the coating layer/s, since the cutting of the different materials will be made on the same contour.

The invention claimed is:

1. Manufacturing process for a coated spectacle frame, comprising the steps of:

coating a structural layer of material with at least one coating layer of material, thereby resulting in a coated panel;

cutting though the structural and coating layers of the coated panel to receive a spectacle frame blank in a single piece, the spectacle frame blank defining a front part and two ear pieces formed integrally with the front part;

bending the spectacle frame blank, thereby obtaining the coated spectacle frame free of seams and rendering the structural and coating layers visible along edges of the coated spectacle frame.

2. A spectacle frame according to the process comprising:

coating structural layer of material with at least one coating layer of coating material, thereby resulting in a coated panel;

cutting through the structural and coating layers of the coated panel to receive a spectacle frame blank;

bending the spectacle frame blank into the spectacle frame, the spectacle frame comprising:

a front part and two ear pieces formed front a single piece, the two ear pieces formed integrally with the front part; and a contour of the spectacle frame that is free of seams, wherein the structural and coating layers of the spectacle frames are visible along edges of the spectacle frame.

3. The spectacle frame as claimed in claim 2, wherein structural layer is made of a composite material, while the coating material for each of the at least one coating layer is made of a material selected from the group including: textile material, leather, wood, plastic material, and rubber.

4. The spectacle frame as claimed in claim 2, wherein the structural layer is made of a plastic material, while the coating material for each of the at least one coating layer is made of a material selected from the group including: textile material, leather, wood, plastic material, and rubber.

5. The spectacle frame as claimed in claim 2, wherein the structural layer is made of wood, while the coating material for each of the at least one coating layer is made of a material selected from the group including: textile material, leather, wood, plastic material, and rubber.

6. The spectacle frame as claimed in claim 2, wherein the structural layer is made of metal, while the material for each of the at least one coating layer is made of a material selected from the group including: textile material, leather, wood, plastic material, and rubber.

7. Manufacturing of claim 1, further comprising the step of:

shaping the coated spectacle frame.

* * * * *

UNITED STATES PATENT AND TRADEMARK OFFICE
CERTIFICATE OF CORRECTION

| | | |
|---|---|---|
| PATENT NO. | : 9,448,419 B2 | |
| APPLICATION NO. | : 14/406270 | |
| DATED | : September 20, 2016 | |
| INVENTOR(S) | : Eric Balzan and Mirko Forti | |

It is certified that error appears in the above-identified patent and that said Letters Patent is hereby corrected as shown below:

In the Claims

Claim 2, Column 3 Line 16:

Change:
-- front --
to
"from" (Second Occurrence)

Signed and Sealed this
Twenty-eighth Day of February, 2017

Michelle K. Lee
*Director of the United States Patent and Trademark Office*